July 14, 1936.  W. C. PFEIFFER  2,047,428
TYPEWRITER ATTACHMENT
Filed May 12, 1934  7 Sheets-Sheet 1

Inventor
WILLIAM C. PFEIFFER,
BY
Toulmin & Toulmin
Attorneys

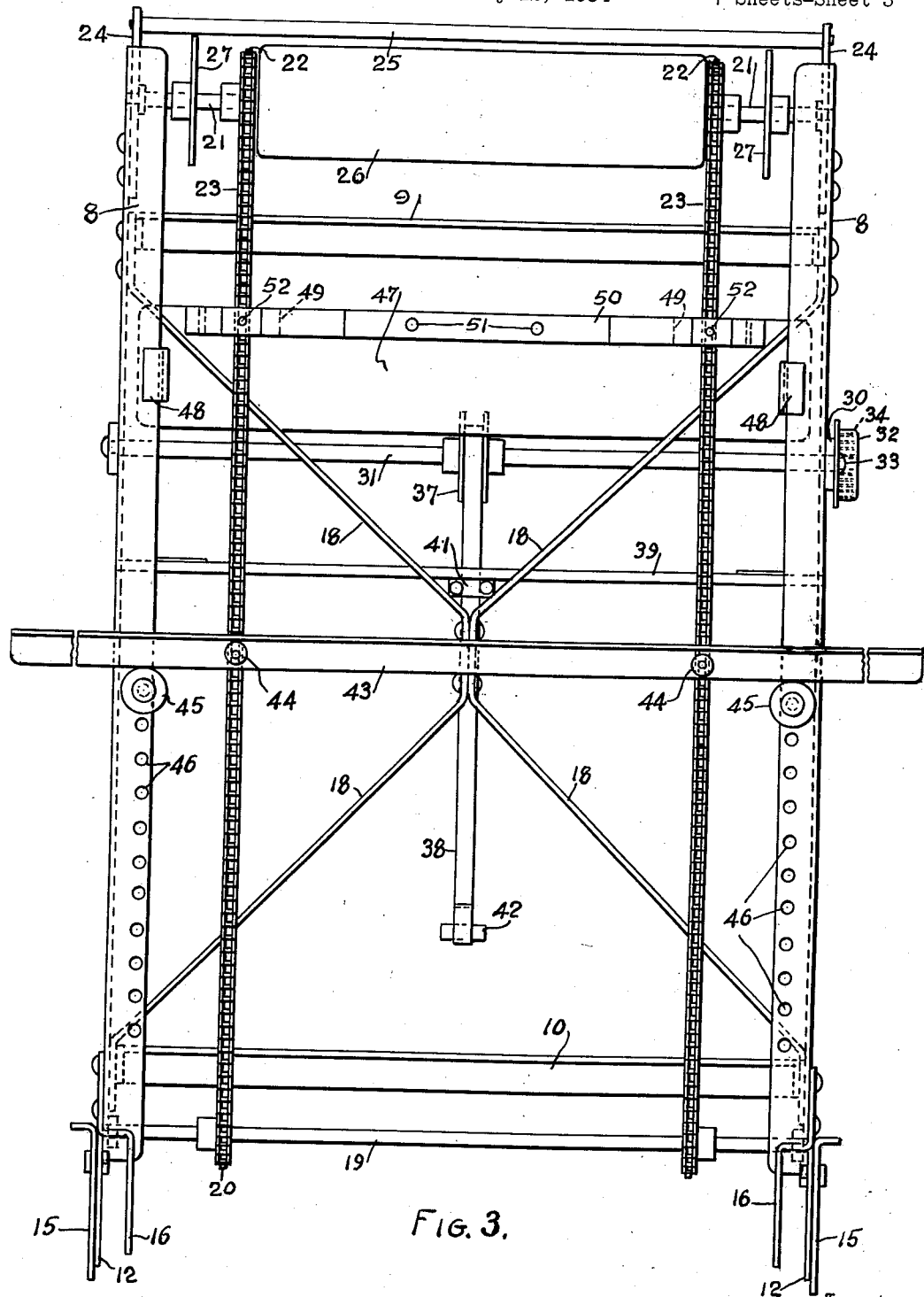

July 14, 1936. W. C. PFEIFFER 2,047,428
TYPEWRITER ATTACHMENT
Filed May 12, 1934 7 Sheets-Sheet 4
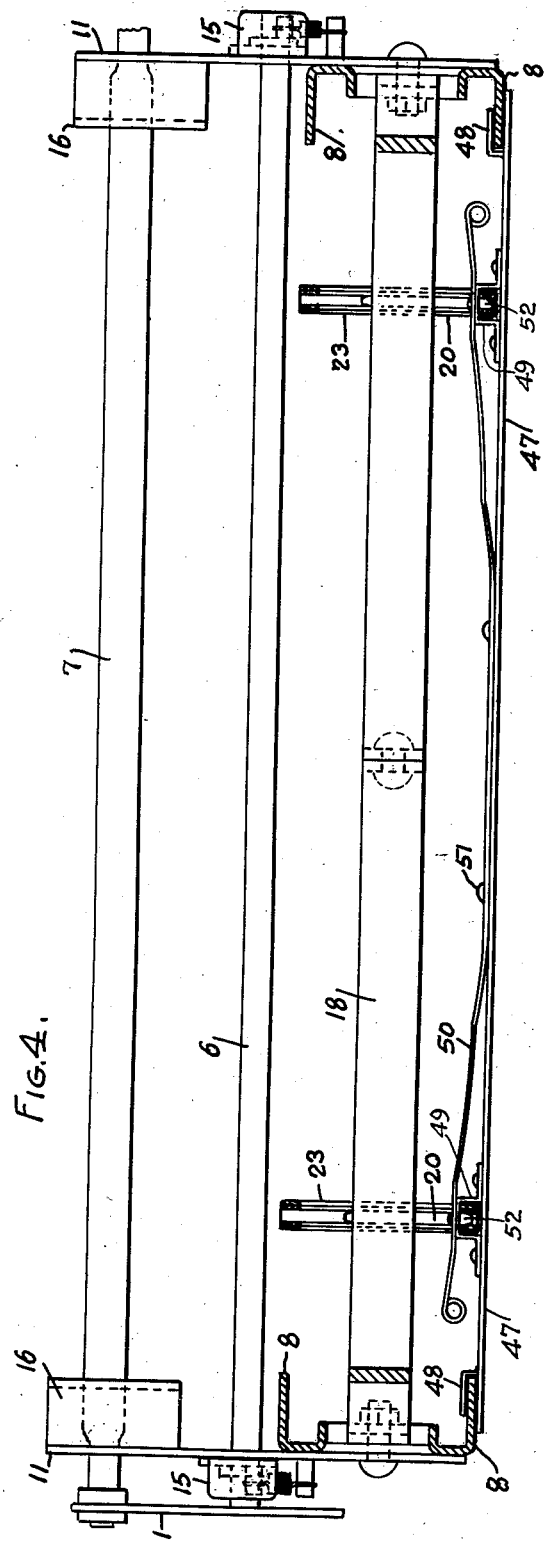
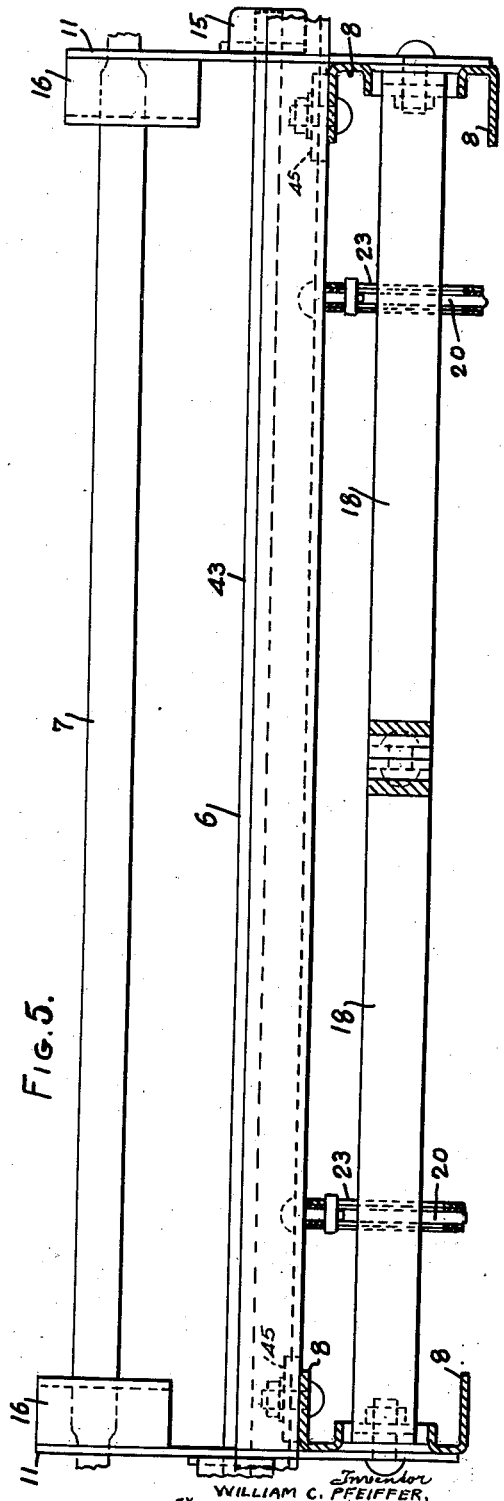
Inventor
WILLIAM C. PFEIFFER,
Toulmin & Toulmin
Attorneys July 14, 1936.     W. C. PFEIFFER     2,047,428
TYPEWRITER ATTACHMENT
Filed May 12, 1934     7 Sheets-Sheet 5
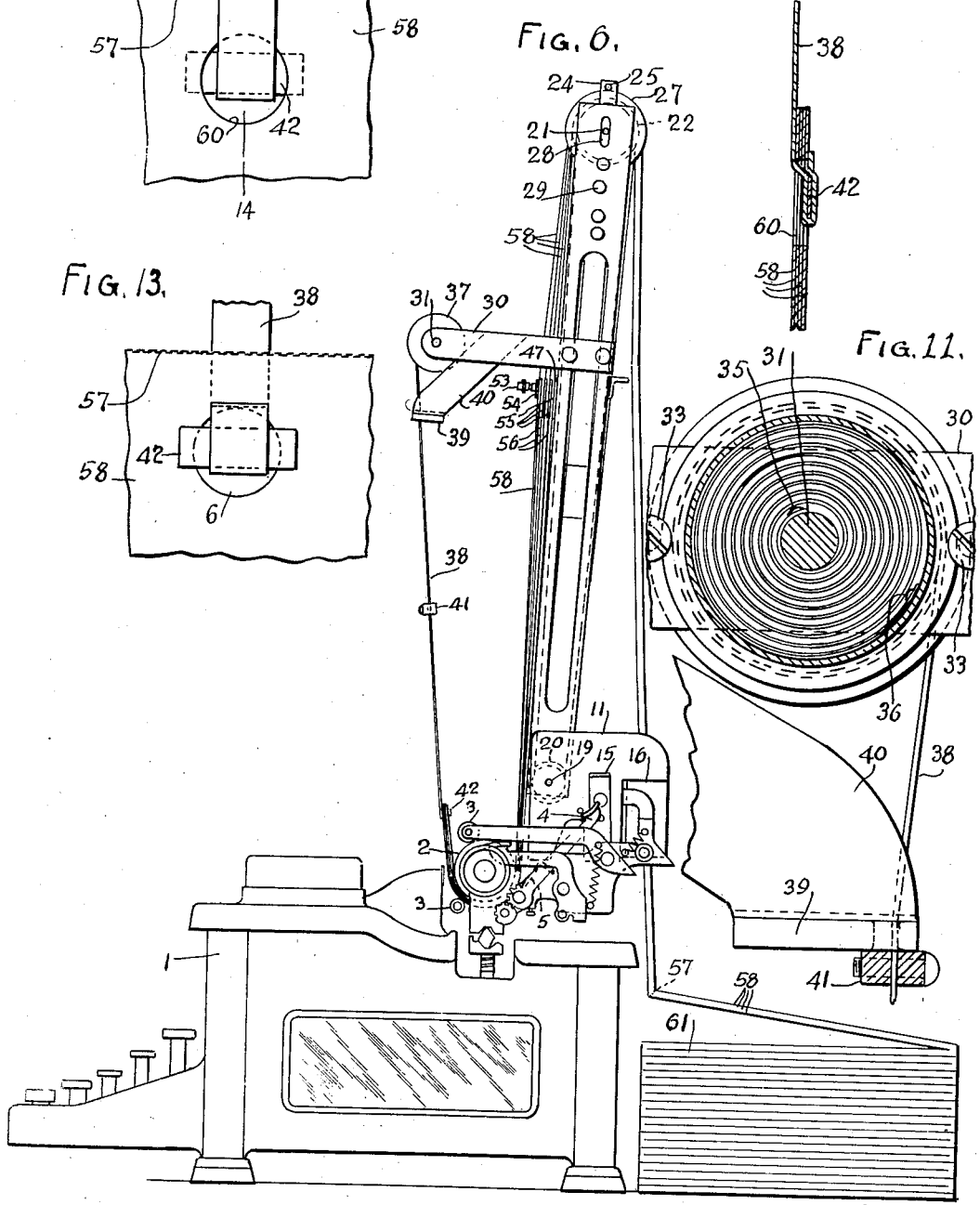

July 14, 1936.  W. C. PFEIFFER  2,047,428
TYPEWRITER ATTACHMENT
Filed May 12, 1934   7 Sheets-Sheet 6

Inventor
WILLIAM C. PFEIFFER,
BY
Toulmin & Toulmin
Attorneys

July 14, 1936.　　　　W. C. PFEIFFER　　　　2,047,428
TYPEWRITER ATTACHMENT
Filed May 12, 1934　　　7 Sheets-Sheet 7

Inventor
WILLIAM C. PFEIFFER,
By Toulmin & Toulmin
Attorneys

Patented July 14, 1936

2,047,428

UNITED STATES PATENT OFFICE 2,047,428

TYPEWRITER ATTACHMENT

William C. Pfeiffer, Dayton, Ohio, assignor to The Egry Register Company, Dayton, Ohio, a corporation of Ohio Application May 12, 1934, Serial No. 725,384

6 Claims. (Cl. 197—126)

This invention relates to improvements in attachments for use in connection with typewriters, and has for its object to provide an apparatus for feeding a plurality of superimposed strips of paper to a typewriter and maintaining the strips in proper alignment with respect to each other.

It is an object of this invention to provide an apparatus for supporting and delivering to a typewriter superimposed strips of paper and maintaining the forward ends of the strips of paper in an aligned and tight condition.

It is also an object of the invention to provide, in connection with a typewriter, means for delivering superimposed strips of paper to a typewriter and yieldingly supporting the forward ends of the strips so they are always maintained in a slightly tightened condition.

It is also an object to provide, in connection with a typewriter, apparatus for supporting and guiding to the typewriter a plurality of superimposed strips of paper with interleaved sheets of carbon paper between them.

It is a further object to provide a method of feeding superimposed strips of paper divided by cross perforations into sheets with interleaved carbon sheets to a typewriter, which consists in first advancing the strips of paper and the carbon sheets through the typewriter, withdrawing the strips of paper and the interleaved carbon sheets, advancing the strips of paper without the carbon sheets until the carbon sheets are interleaved between a succeeding set of sheets formed from the strips of paper, advancing the strips of paper and the carbon sheets so as to bring the strips of paper to a position to be written on, and thereafter tearing off the strips of paper already written on.

In particular, this invention consists of yieldingly holding the paper strips alone at their forward ends to cooperate in advancing them with the carbon sheets as the paper sheets and carbon sheets are moved by the platen and its presser roller; and for the further purpose of yieldingly cooperating with the platen when the carbon sheets and paper sheets are returned to their initial position after having been written upon, whereupon the yielding means holding the ends of the paper sheets will pull the paper sheets forwardly without moving the platen with respect to the carbon sheets so that the paper sheets written upon may be torn off and a new operation started. The hand of the operator is not used to move the paper sheets written upon back to the tear-off position, but this is done automatically by the yielding pulling means operating on the sheets when the carbon sheets and paper sheets have been retracted to their initial position.

Referring to the drawings:

Figure 3 is a rear elevation of the attachment.

Figure 4 is a section on the line 4—4 of Figure 2.

Figure 5 is a section on the line 5—5 of Figure 2.

Figure 6 is a side elevation of the typewriter with the attachment thereon, and with the paper in the position shown in Figure 1.

Figure 11 is a section through the tension drum, showing the spring for maintaining the forward ends of the strips of paper in slightly tight condition.

Figure 12 shows the means for attaching the tension strap to the strips of paper.

Figure 13 is a view taken from the opposite side of the strips of paper as shown in Figure 12.

Figure 14 is a section on the line 14—14 of Figure 12.

Figure 9:
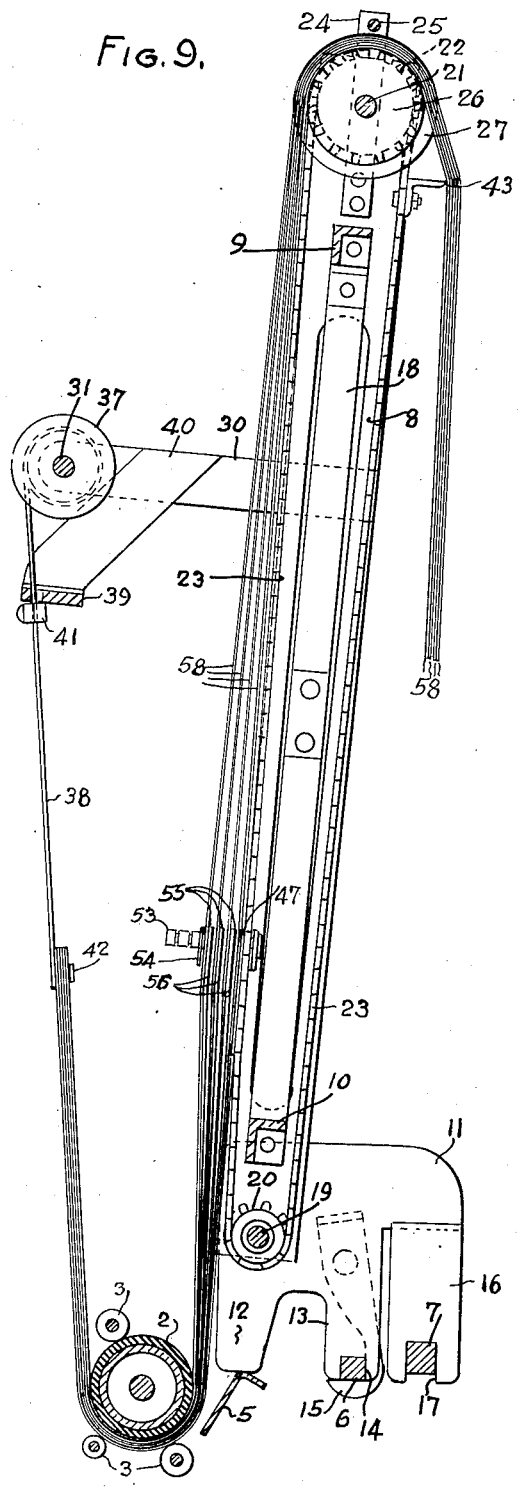
Figure 9 is a view similar to Figure 7 but showing the strips of paper and the carbon sheets in their positions at the end of the writing operation.
Figure 10:
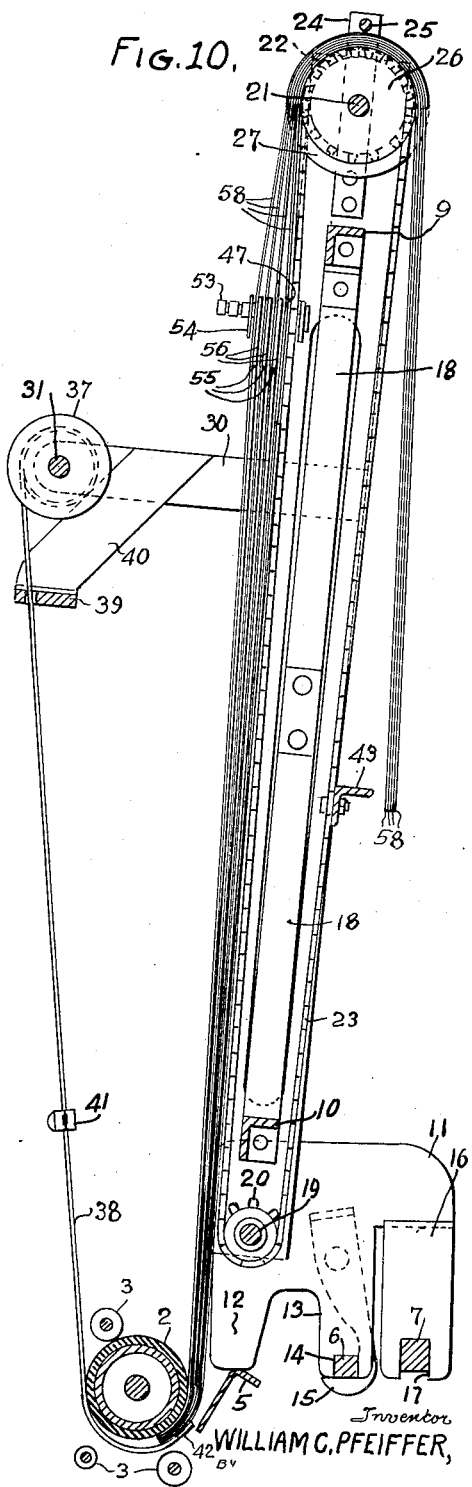
Figure 10 is a view similar to Figure 9 but showing the strips of paper and the sheets of carbon withdrawn so that the carbon sheets are not clamped between the platen and the presser rollers.

The numeral 1 is used to designate a typewriter, which has the usual platen 2, presser rollers 3 and a release lever 4 (Figure 6). On the typewriter there is a transverse frame member 5, an intermediate transverse rod 6 and a rear transverse rod 7 (Figure 9). These members 5, 6 and 7 support the frame, which is rectangular in shape and has side members 8 connected by an upper cross member 9 and a lower cross member 10.

To the lower end of each side member is attached a bracket 11 (Figure 9). Each bracket has a front leg 12 adapted to rest upon the frame member 5, an intermediate leg 13 with a notch 14 therein to receive the rod 7, and a rear leg 16 with a notch 17 therein to receive the rod 7. For the purpose of holding the brackets on the typewriter each bracket is provided with a latch 15 for engagement underneath the rod 6. The side members are braced by diagonally disposed brace members 18 (Figures 2, 3 and 9).

Figure 2:
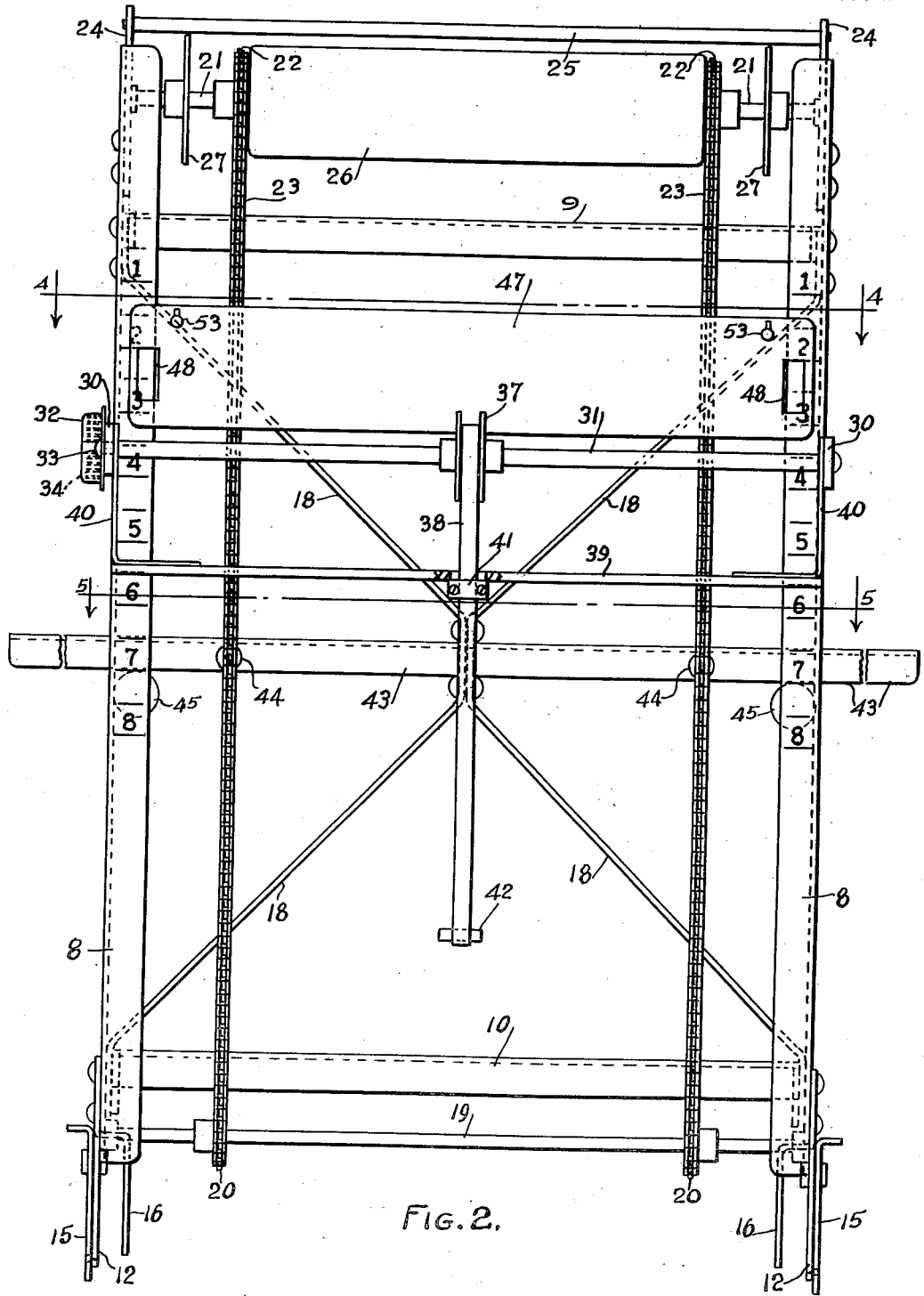
Figure 2 is a front elevation of the attachment removed from the typewriter.

In the lower ends of the side members 8 is a shaft 19 which has thereon a pair of sprockets 20 (Figures 2, 3 and 9). Adjacent the upper ends of the side members is an upper shaft 21, which has thereon sprockets 22 connected to the sprockets 20 by means of chains 23. The upper shaft has its ends rotatably mounted in bars 24 suitably attached to the side members 8 and adjustably supported by means of bolts or rivets 29. The upper ends of the bars 24 are connected by a rotating shaft 25, which is spaced from and is just above guiding discs 27 mounted at each end of a drum 26. This drum and the guiding discs are mounted upon the upper shaft 21 for rotation therewith through the operation of the sprockets and chains.

For the purpose of permitting a limited amount of adjustment of the shaft 21 the side members 8 are provided with slots 28 (Figure 6). Extending forwardly from each side member 8 at a point about two-thirds of the distance from the bracket 11 to the top of the side member is an arm 30. These arms extend substantially at right angles from the side members and rotatably support on their free ends a shaft 31. Attached to one of the arms 30 by means of screws 33 is a drum 32. In this drum (Figure 11) is a spring 34 which has one end attached to the drum and its other end attached to the shaft for rotating the shaft when the spring is wound in a certain direction. The spring is attached to the shaft 31 by means of a screw or similar member 35, and is attached to the drum by means of a screw or similar member 36.

On the shaft 31, about halfway between the arms 30, there is a grooved pulley 37 (Figure 2), which is fixed to the shaft for rotation therewith. In the groove of this pulley is attached one end of a tape or strap 38. This tape or strap passes through a hole in a bar 39, which is supported at each end by means of an arm 40. Each arm is attached at one end to one of the arms 30 and extends downwardly and forwardly, and has attached to its other end one end of the bar 39 so that the bar 39 is slightly in advance of the shaft 31 when the frame is in operating position on the typewriter.

The tape or strap 38 is provided with an adjustable stop member 41, which will engage the under surface of the bar 39 to limit the upward movement of the tape. On the lower and free end of this tape is a catch 42 adapted to engage the strips of paper when the tape is inserted through holes therein. At the back of the frame and adjustably attached to the chains is a back bar 43 (Figure 3). In the present instance this bar is angular in shape and is attached to the chains adjustably by means of bolts 44. For the purpose of limiting the downward movement of this bar the side members, which are U-shaped, have holes 46 therein to receive adjustable stops 45.

On the front arms of the U-shaped side members is a carbon carrier plate 47 (Figure 2), each end of which has cut and pressed therefrom a tongue 48 (Figure 4), which engages the back surface of the front arm of the side member 8. At the back of the carbon carrier plate 47 is a pair of loops 49 through which the chains 23 pass. By means of these loops the carbon carrier plate is held on the chains but may be adjusted. For the purpose of supporting and adjusting the chains in any particular position there is provided on the back of the carbon carrier plate a spring 50 (Figure 4), which is attached intermediate its ends to the carbon carrier plate 47 by means of rivets 51. Each end of the spring 50 has a pin 52 therein adapted to extend through a hole in the loop 49 and through a link of the chain 23.

Figure 1:
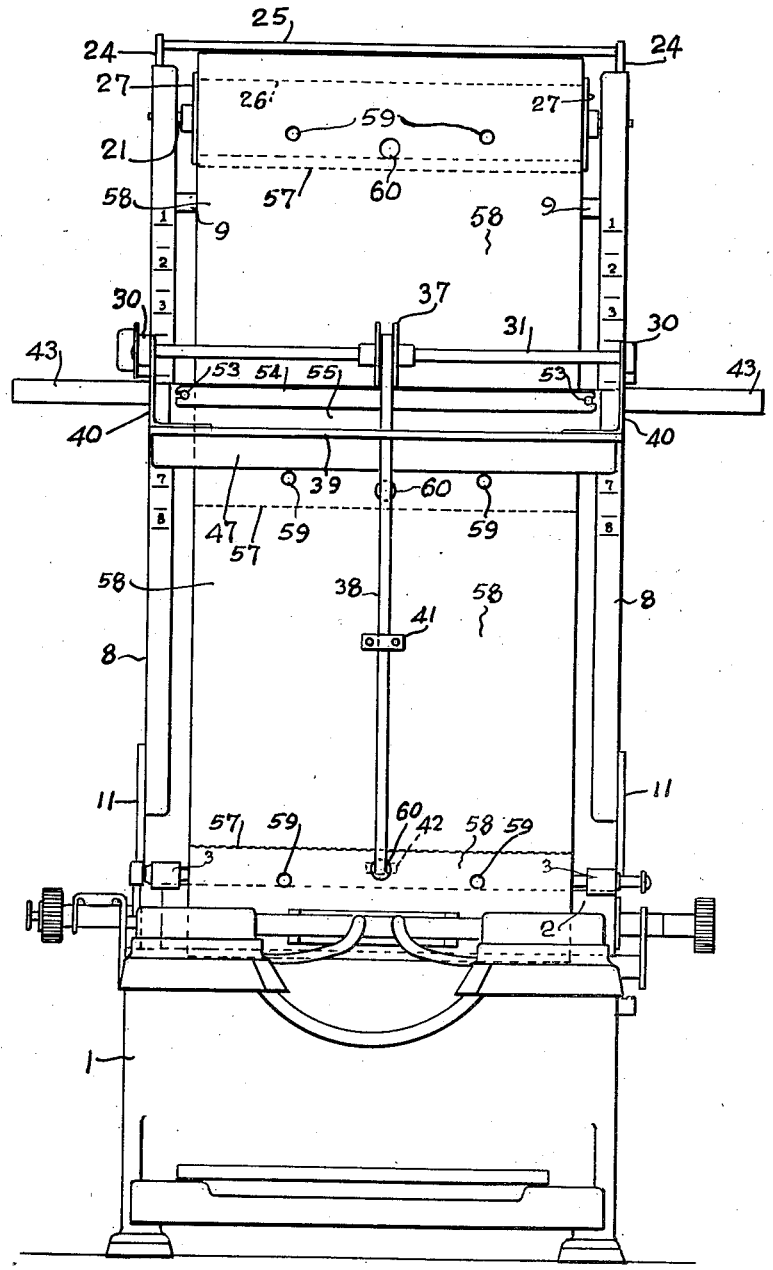
Figure 1 is a front elevation of the attachment and the typewriter to which it is attached, showing the paper in its initial position for writing purposes.

This spring and pin structure and the loops 49 are on the back or rear face of the carbon carrier plate 47. This plate 47 has on its front face, adjacent its upper edge at each end, a pin 53 adapted to support carbon carriers in the form of strips 55, each provided at its end with a hole to receive the pin 53 (Figures 1 and 2). On each strip is a sheet of carbon paper 56. The assembled carbon-supporting strips 55 and carbon sheets 56 are held on the pins 53 by means of a spring plate 54, which is notched at each end to receive a pin.

The paper to be written on is in the form of a long strip, divided by perforations 57, into sheets 58. Adjacent the forward end of each sheet of paper are aligned holes 59. Between these aligned holes and at the center and adjacent the front edge of each sheet of paper is a central perforation 60 adapted to receive the tape 38 so that the tape, in combination with the drum, the shaft and the spring will maintain the advanced ends of the sheets of paper in alignment and in a tense condition. The strips of paper in the form of sheets are shown in folded condition at the back of the typewriter, as indicated by the numeral 61 (Figure 6). On the front of the side members of the frame are numerals 1 to 8 for the purpose of assisting in the operation of the strips of paper and the carbon sheets.

Figure 7:
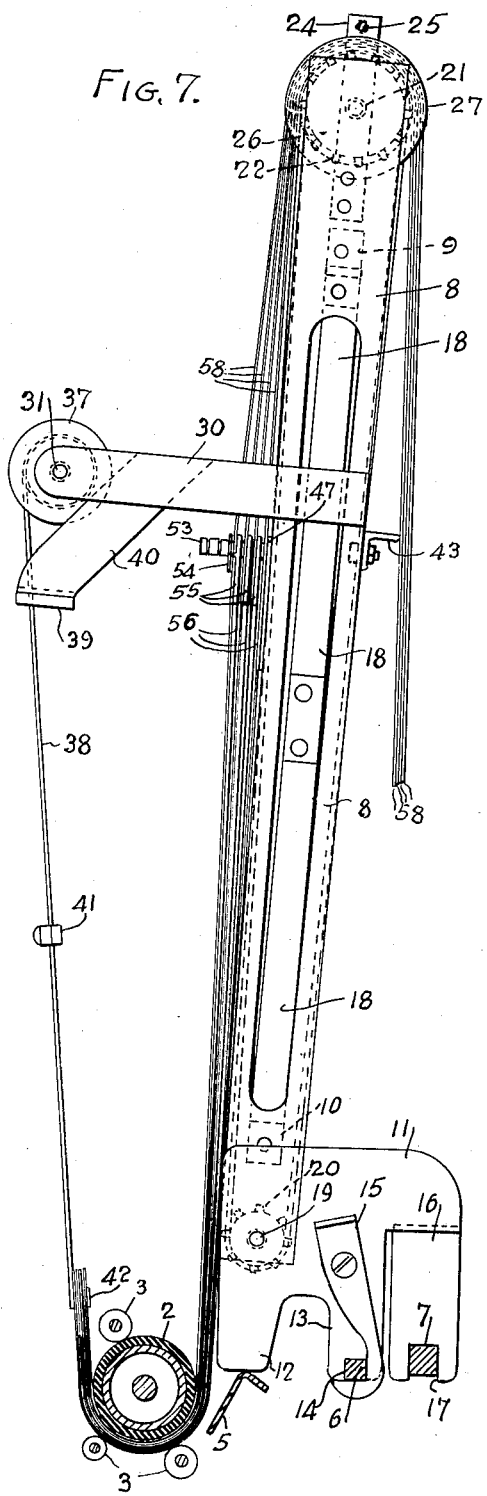
Figure 7 is a side elevation of the attachment with the paper in the position shown in Figures 1 and 6, and also showing the platen of the typewriter and the presser rollers.
Figure 8:
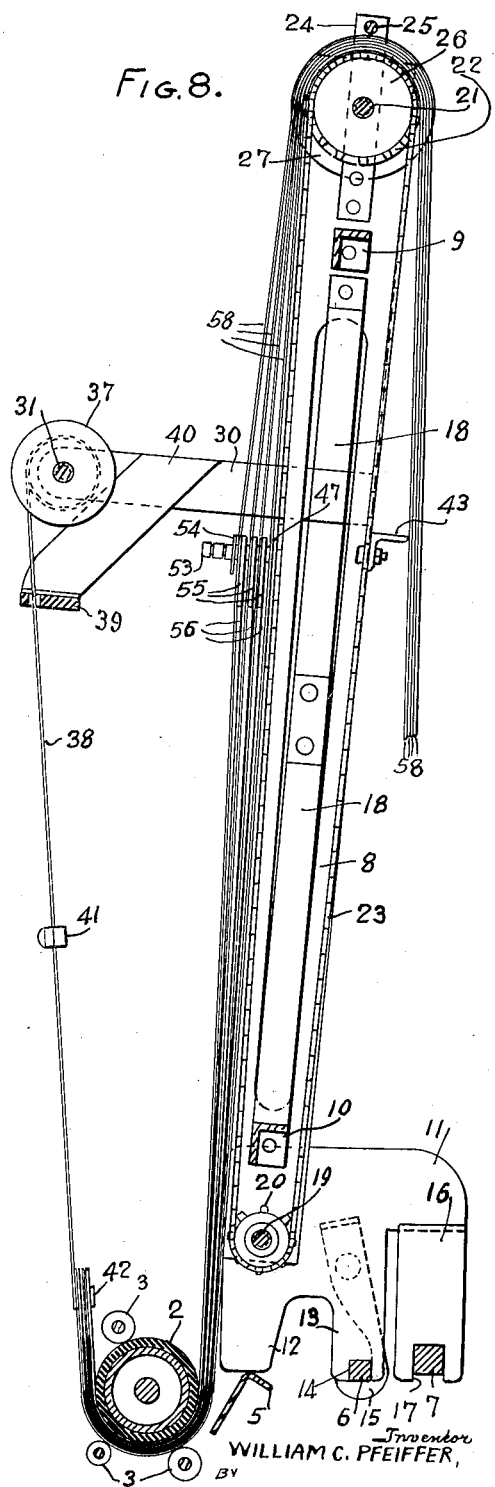
Figure 8 is a vertical section through the parts shown in Figure 7.

As shown in Figures 1, 6 and 7, the strips of paper 58 and carbon sheets 56 are in position for writing purposes. The free ends of the strips of paper are supported by means of the strap 38 and the drum 32. As the typewriter is operated the paper advances, the spring in the drum 32 operating through the shaft 31 and the tape 38 always maintaining the front ends of the strips of paper in a tight condition.

After the writing operation has been completed the strips of paper 58 and carbon sheets 56 are in the position shown in Figure 9. At this point in the operation the release lever 4 is operated to release the presser rollers and the back bar 43 is gripped by the hand of the operator and forced downwardly, carrying with it the strips of paper and the carbon sheets. This operation continues until the back bar 43 reaches the stops 45. At this point in the operation the carbon sheets 56 are so withdrawn that they can not be gripped between the presser rollers 3 and the platen 2. The front ends of the previously written on paper sheets are in a position to be gripped between the platen and the presser rollers.

The strips of paper are next advanced so that a second set of paper sheets is brought into position so that the carbon sheets are interleaved between them. This advancement of the strips of paper is effected by the operation of the platen and the presser rollers, the lever for operating the presser rollers having been moved to a position so that the rollers will operate with the platen for feeding the strips of paper. After the strips of paper have been thus advanced with the carbon sheets in proper position between the paper sheets, the carbon sheets are caused to advance with the strips of paper. This is done by slightly pressing upon the strips of paper or by gripping the assembled papers so that the carbon sheets will advance with the strips of paper.

After the assembly has been advanced to a point where the sheets that have been written on can be torn off, they are removed by tearing and the strap is attached to a succeeding group of sheets of paper by having the catch member 42 pass through the holes 60. The typewriter, the assembled strips of paper and the sheets of carbon are in position for the second writing operation.

The successive steps of operation are as follows:

(1) The paper sheets and carbon sheets are placed in position to be written upon around the platen, with the presser rollers holding the sheets on the platen, the strap connected at one end to the yielding means and the hook in the holes of the paper strips.

(2) The writing operation then takes place.

(3) At the end of the writing operation the presser roller is released and both carbon and paper sheets are moved back until the ends of the carbon sheets have passed around the platen, whereupon the spring pulling the strap will be strong enough to pull the paper sheets back to the position which they occupied after being written upon.

(4) Then the presser roller is restored to pressure position and the paper sheets written upon are torn off, leaving the next section of paper sheets properly interleaved with carbon sheets.

It will be noted that this arrangement greatly economizes on the length of the paper with respect to the carbon, bringing the carbon sheets much closer to the top of the paper sheets.

It will be understood that I desire to comprehend within my invention such modifications as come within the scope of my claims and my invention.

Having thus fully described my invention, what I claim as new and desire to secure by Letters Patent, is:

1. In combination with a typewriter having means thereon to advance a strip of paper through the typewriter, a frame having side members adapted to be attached to the typewriter, an arm on each side member, a shaft supported by the arms, a drum on one arm, a coil spring in the drum having one end attached to the drum and its other end attached to the shaft, a pulley on the shaft, a strap attached at one end to the pulley and having means on its other end to engage the leading end of the strip, means on the arms to guide the strap, and stop means on the strap to engage the guide means.

2. In combination with a typewriter having means thereon to advance a strip of paper through the typewriter, a frame having side members adapted to be attached to the typewriter, an arm on each side member, a shaft supported by the arms, a drum on one arm, a coil spring in the drum having one end attached to the drum and its other end attached to the shaft, a pulley on the shaft, a strap attached at one end to the pulley and having means on its other end to engage the leading end of the strip, means on the arms to guide the strap, and an adjustable stop means on the strap to engage the guide means.

3. A method of making duplicate copies of writings comprising feeding interleaved paper strips and carbon sheets around a platen step-by-step while writing, constantly applying during positioning and writing a forward longitudinal force to the paper strips adjacent their delivery edges without applying such force to the carbon sheets, maintaining the paper strips and carbon sheets in non-slipping engagement during writing by applying thereto a transverse pressure, retracting the written paper strips and carbon sheets to their initial positions, releasing said transverse pressure, and permitting said longitudinal force to pull the written paper forms forwardly away from the carbon sheets and into their delivery positions.

4. A method of making duplicate copies of writings comprising feeding interleaved paper strips and carbon sheets around a platen step-by-step while writing, constantly applying during positioning and writing a forward longitudinal force to the paper strips adjacent their delivery edges without applying such force to the carbon sheets, maintaining the paper strips and carbon sheets in non-slipping engagement during writing by applying thereto a transverse pressure, retracting the written paper strips and carbon sheets to their initial positions, releasing said transverse pressure, permitting said longitudinal force to pull the written paper forms forwardly away from the carbon sheets and into their delivery positions, releasing said longitudinal force from said paper strips, and tearing off the written paper forms from the strips.

5. In a typewriter attachment, an upwardly-extending frame, means on said frame for supporting a plurality of superimposed strips of paper, means to support between the strips and to move longitudinally thereof carbon sheets, a forwardly-extending support attached to said frame, a yieldingly-urged drum mounted upon said support, and a flexible connector interconnecting said drum and the delivery edges of said paper strips without engaging said carbon sheets whereby to exert a longitudinal forward force upon said paper strips through a predetermined distance during writing and positioning so as to automatically return the written set of paper forms to the delivery position after the retraction and separation of the carbon sheets therefrom, said flexible connector having interpenetrating means on the unsupported end thereof for engagement with perforations in the delivery edges of the paper sheets, whereby the flexible connector is engaged with the delivery edges of the sheets.

6. In a typewriter attachment, an upwardly-extending frame, means on said frame for supporting a plurality of superimposed strips of paper, means to support between the strips and to move longitudinally thereto carbon sheets, a forwardly-extending support attached to said frame, a yieldingly-urged drum mounted upon said support, said drum being disposed substantially over the platen of the typewriter, and a flexible connector interconnecting said drum and the delivery edges of said paper strips without engaging said carbon sheets whereby to exert a longitudinal forward force upon said paper strips through a predetermined distance during the writing and positioning so as to automatically return the written set of paper forms to the delivery position after the retraction and separation of the carbon sheets therefrom, said flexible connector having on the unsupported end thereof interpenetrating means for engagement with perforations in the delivery edges of the paper sheets, whereby the flexible connector is engaged with the delivery edges of the sheets.

WILLIAM C. PFEIFFER.